United States Patent
Du et al.

(10) Patent No.: US 10,025,157 B2
(45) Date of Patent: *Jul. 17, 2018

(54) ELECTROPHORETIC FLUID

(71) Applicant: E INK CALIFORNIA, LLC, Fremont, CA (US)

(72) Inventors: Hui Du, Milpitas, CA (US); Yu Li, Fremont, CA (US); Wei-Ho Ting, Taichung (TW); HongMei Zang, Fremont, CA (US); Ming Wang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,634

(22) Filed: Dec. 21, 2017

(65) Prior Publication Data

US 2018/0113368 A1    Apr. 26, 2018

Related U.S. Application Data

(63) Continuation-in-part of application No. 15/163,926, filed on May 25, 2016, now Pat. No. 9,864,253, which is a continuation of application No. 13/549,028, filed on Jul. 13, 2012, now Pat. No. 9,372,380, which is a continuation-in-part of application No. 13/363,741, filed on Feb. 1, 2012, now Pat. No. 9,366,935.

(60) Provisional application No. 61/439,302, filed on Feb. 3, 2011.

(51) Int. Cl.
| | |
|---|---|
| G02F 1/167 | (2006.01) |
| C09K 9/00 | (2006.01) |
| G02F 1/00 | (2006.01) |
| G02B 26/00 | (2006.01) |
| H01B 1/00 | (2006.01) |
| H01B 1/12 | (2006.01) |

(52) U.S. Cl.
CPC ...... *G02F 1/167* (2013.01); *G02F 2001/1678* (2013.01)

(58) Field of Classification Search
CPC .................................................... G02F 1/167
USPC ......... 252/500, 518.1, 519.33, 583; 359/238, 359/296; 525/330.3
See application file for complete search history.

(56) References Cited

U.S. PATENT DOCUMENTS

| | | |
|---|---|---|
| 4,387,138 A | 6/1983 | Gift |
| 5,964,935 A | 10/1999 | Chen |
| 6,113,810 A | 9/2000 | Hou |
| 6,822,782 B2 | 11/2004 | Honeyman |
| 6,859,302 B2 | 2/2005 | Liang |
| 6,866,760 B2 | 3/2005 | Paolini, Jr. |

(Continued)

OTHER PUBLICATIONS

Liang, R.C., "BreakThrough-Newly-Developed Color Electronic Paper Promises—Unbeatable Production Efficiency", Nikkei Microdevices, p. 3 (Dec. 2002). (in Japanese, with English translation).

(Continued)

*Primary Examiner* — Bijan Ahvazi
(74) *Attorney, Agent, or Firm* — Brian D. Bean

(57) ABSTRACT

A red particle for an electrophoretic display. The particle includes a core of a diketopyrrolopyrrole pigment, a shell around the core comprising a methacrylate, and steric siloxane molecules extending from the shell.

5 Claims, 2 Drawing Sheets

(56) References Cited

U.S. PATENT DOCUMENTS

| | | | |
|---|---|---|---|
| 6,930,818 | B1 | 8/2005 | Liang |
| 7,130,107 | B2 | 10/2006 | Liu |
| 7,230,750 | B2 | 6/2007 | Whitesides |
| 7,382,514 | B2 | 6/2008 | Hsu |
| 7,545,557 | B2 | 6/2009 | Iftime |
| 7,576,903 | B2 | 8/2009 | Yamamoto |
| 7,678,862 | B2 | 3/2010 | Minami |
| 7,772,339 | B2 | 8/2010 | Minami |
| 7,855,829 | B2 | 12/2010 | Yamamoto |
| 8,363,306 | B2 | 1/2013 | Du |
| 8,582,196 | B2 | 11/2013 | Walls |
| 8,633,891 | B2 | 1/2014 | Nagai |
| 8,815,394 | B2 | 8/2014 | Carlini |
| 8,969,261 | B2 | 3/2015 | Talingting Pabalan |
| 9,115,464 | B2 | 8/2015 | Greinert |
| 9,366,935 | B2 * | 6/2016 | Du ............................ G02F 1/167 |
| 9,372,380 | B2 * | 6/2016 | Du ............................ G02F 1/167 |
| 9,464,300 | B2 | 10/2016 | Prieve et al. |
| 9,864,253 | B2 * | 1/2018 | Du ............................ G02F 1/167 |
| 2006/0132896 | A1 * | 6/2006 | Hsu ..................... C09B 67/0004 359/296 |
| 2007/0269730 | A1 * | 11/2007 | Lee ....................... C08F 257/02 430/105 |
| 2009/0009852 | A1 | 1/2009 | Honeyman |
| 2013/0222888 | A1 | 8/2013 | Urano |
| 2014/0011913 | A1 | 1/2014 | Du |
| 2015/0301425 | A1 | 10/2015 | Du |
| 2016/0266463 | A1 | 9/2016 | Du |
| 2017/0137632 | A1 | 5/2017 | Du |

OTHER PUBLICATIONS

Liang, R.C. et al., "Microcup Electrophoretic Displays by Roll-to-Roll Manufacturing Processes", IDW '02, Paper EP2-2, pp. 1337-1340, (Dec. 2002).
Liang, R.C., "Microcup Electrophoretic and Liquid Crystal Displays by Roll-to-Roll Manufacturing Processes", Presented at Flexible Microelectronics & Displays Conference of U.S. Display Consortium, Phoenix, Arizona, USA (Feb. 2003).
Liang, R.C. et al., "Microcup LCD, A New Type of Dispersed LCD by a Roll-to-Roll Manufacturing Process", Presented at IDMC , Paper We-02-04, pp. 1-4, Taipei, Taiwan, (Feb. 2003).
Liang, R.C. et al., "Passive Matrix Microcup Electrophoretic Displays", IDMC'03, Paper FR-17-5, p. 1-4, Taipei, Taiwan, (Feb. 2003).
Liang, R.C.et al., "Microcup Displays: Electronic Paper by Roll-to-Roll Manufacturing Processes" Journal of the SID, 11 (4), pp. 621-628, (Feb. 2003).
Chen, S.M., "Revolution electronic paper: The New Application and the Dynamics of Companies", Topology Research Institute, pp. 1-10, (May 2003). (In Chinese, English abstract attached).
Liang, R.C. et al., "Microcup Active and Passive Matrix Electrophoretic Displays by a Roll-to-Roll Manufacturing Processes", SID 03 Digest, Paper 20.1, pp. 838-841 (May 2003).
Lee, H. et al., "SiPix Microcup Electronic Paper—An Introduction" Advanced Display, Issue 37, pp. 4-9, (Jun. 2003). (in Chinese, English abstract attached).
Chen, S.M., "The Applications for the Revolutionary Electronic Paper Technology", OPTO News & Letters, 102, pp. 37-41 (Jul. 2003). (in Chinese, English abstract attached).
Zang, H.M. et al., "Microcup Electronic Paper by Roll-to-Roll Manufacturing Processes", The Spectrum, 16(2), pp. 16-21 (2003).
Allen, K., "Electrophoretics Fulfilled. Emerging Displays Review: Emerging Display Technologies, Monthly Report", Stanford Resources Display Insight, pp. 9-14 (Oct. 2003).
Kleper, M. et al., "An Investigation of the Emerging and Developing Technologies Related to the Generation Beyond Print-on-Paper", Advanced Display Technologies, Rochester Institute of Technology, pp. 13-15, (Oct. 2003).

Zang, K.M., "Microcup Electronic Paper by Roll-to-Roll Manufacturing Processes", Presentation at the Advisory Board Meeting, Bowling Green State Univ., Ohio, USA (Oct. 2003).
Chung, J. et al., "Microcup Electrophoretic Displays, Grayscale and Color Rendition", IDW, AMD2 & EP1-2, pp. 243-246 (Dec. 2003).
Ho, C. et al., "Microcup Electronic Paper by Roll-to-Roll Manufacturing Processes", Presentation conducted at FEG, Nei-Li, Taiwan, (Dec. 2003).
Zang, H.M. et al., "Threshold and Grayscale Stability of Microcup Electronic Paper", SPIE vol. 5289, pp. 102-108, (Jan. 2004).
Zang, H.M. "Microcup Electronic Paper", Presentation at the Displays & Microelectronics Conference of U.S. Display Consortium, Phoenix, Arizona, USA (Feb. 2004).
Wang, X. et al., "Microcup Electronic Paper and the Converting Processes", ASID, 10.1.2-26, pp. 396-399, Nanjing, China, (Feb. 2004).
Chaug, Y.S. et al., "Roll-to-Roll Processes for the Manufacturing of Patterned Conductive Electrodes on Flexible Substrates", Mat. Res. Soc. Symp. Proc., vol. 814, I9.6.1., (Apr. 2004).
Liang, R.C., "Microcup Electronic Paper by Roll-to-Roll Manufacturing Process", Presented at the Flexible Displays & Electronics 2004 of Intertech, San Fransisco, California, USA, (Apr. 2004).
Hou, J. et al., "Reliability and Performance of Flexible Electrophoretic Displays by Roll-to-Roll Manufacturing Processes", SID Digest, 32.3, pp. 1066-1069 (May 2004).
Wang, X. et al., "Microcup Electronic Paper and the Converting Processes", Advanced Display, Issue 43, pp. 48-51 (Jun. 2004). (in Chinese, with English abstract).
Liang, R.C. et al., "Format Flexible Microcup Electronic Paper by Roll-to-Roll Manufacturing Process", Presented at 14th FPD Manufacturing Technology EXPO & Conference, Tokyo, Japan, (Jun. 30, 2004-Jul. 2, 2004).
Liang, R.C., "Flexible and Rollable Displays/Electronic Paper—A Technology Overview", Presented at the METS conference, Taipei, Taiwan, (Oct. 2004).
Bardsley, J.N. et al., "Microcup Electrophoretic Displays", USDC Flexible Display Report, 3.1.2. pp. 3-12 to 3-16, (Nov. 2004).
Ho, Candice, "Microcup Electronic Paper Device and Application", Presentation conducted at USDC 4th Annual Fexible Display and Microelectronics Conference, Phoenix, Arizona, USA, (Feb. 1, 2005).
Zang, H.M. et al., "Flexible Microcup EPD by RTR Process", Presentation conducted at 2nd Annual Paper-Like Displays Conference, St. Pete Beach, Florida, USA, (Feb. 9-11, 2005).
Liang, R.C.,"Flexible and Roll-able Displays/Electronic Paper—A Brief Technology Overview", Presentation at Flexible Display Forum, Taiwan (Feb. 2005).
Wang, X. et al., "Inkjet Fabrication of Multi-Color Microcup Electrophorectic Display", 5th Flexible Microelectronics & Displays Conference of U.S. Display Consortium, Phoenix, AZ, USA, (Feb. 2006).
Zang, H.M., et al., "Monochrome and Area Color Microcup EPDs by Roll-to-Roll Manufacturing Processes", ICIS 06 International Congress of Imaging Science Final Program and Proceedings, pp. 362-365, Rochester, New York, USA (May 2006).
Wang, X. et al., "Roll-to-Roll Manufacturing Process for Full Color Electrophoretic Film", SID 06 Digest, vol. 37, Issue 1, pp. 1587-1589, (Jun. 2006).
Zang, H.M., "Monochrome and Area Color Microcup EPDs by Roll-to-Roll Manufacturing Process", Presentation conducted at the Fourth Organic Electronics Conference and Exhibition (OEC-06), Frankfurt, Germany, (Sep. 25-27, 2006).
Ho, Andrew, "Embedding e-Paper in Smart Cards, Pricing Labels & Indicators", Presentation conducted at Smart Paper Conference, Atlanta, GA, USA (Nov. 15-16, 2006).
Zang, H.M., "Developments in Microcup Flexible Displays", Presentation conducted at the 6th Annual Flexible Display and Microelectronics Conference, Phoenix, AZ, Feb. 6-8, 2007.
Zang, H.M. et al., "Microcup e-Paper for Embedded and Flexible Designs", IDMC'07, Taipei International Convention Center, Taiwan, (Jul. 2007).
Sprague, R.A., "SiPix Microcup Electrophoretic Epaper for Ebooks", NIP 25, 2009, pp. 460-462; (Sep. 23, 2009). (Presentation

(56) References Cited

OTHER PUBLICATIONS conducted on Sep. 23, 2009 at the 25th Int'l Conference on Digital Printing Technologies,Louisville, Kentucky, USA.).

Werts, M. Badlla, C. Brochon, A. Hebraud, and G. Hadziioannou., "Titanium Dioxide-Polymer Core-Shell Particles Dispersions as Electronic Inks for Electrophoretic Displays", Chem. Mater, 2008, 20, 1292-1298.

Dongri Chao et al.,"Poly(ethylene oxide) Macromonomers IX. Synthesis and Polymerization of Macromonomers Carrying Styryl End Groups with Enhanced Hydrophobicity", Polymer Journal 1991, vol. 23, No. 9, pp. 1045-1052.

Koichi Ito et al., "Poly(ethylene oxide) Macromonomers. 7. Micellar Polymerization in Water", Macromolecules 1991, vol. 24, No. 9, pp. 2348-2354.

Seigou Kawaguchi et al., "Synthesis of polyethylene macromonomers and their radical copolymerizations with methyl methacrylate in homogeneous and oligoethylene melts media" Designed Monomers and Polymers 2000, vol. 3, No. 3, p. 263-277.

Seigou Kawaguchi et al., "Dispersion Polymerization", Adv Polym Sci, 2005, 175, pp. 299-328.

Korean Intellectual Property Office, PCT/US2014/047627, International Search Report and Written Opinion, dated Jul. 22, 2014.

\* cited by examiner

ELECTROPHORETIC FLUID

This application is a continuation-in-part of U.S. patent application Ser. No. 15/163,926, filed May 25, 2016, which is a continuation of U.S. patent application Ser. No. 13/549,028, filed Jul. 13, 2012; now U.S. Pat. No. 9,372,380, which is a continuation-in-part of U.S. patent application Ser. No. 13/363,741, filed Feb. 1, 2012; now U.S. Pat. No. 9,366,935, which claims priority to U.S. Provisional Application No. 61/439,302, filed Feb. 3, 2011; the contents of the above applications are incorporated herein by reference in their entireties.

FIELD OF THE INVENTION

The present invention is directed to the preparation of composite pigment particles that can be used to form an electrophoretic fluid and the resulting display fluid.

BACKGROUND OF THE INVENTION

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate may be either the color of the solvent or the color of the pigment particles. Reversal of plate polarity will cause the particles to migrate back to the opposite plate, thereby reversing the color.

Alternatively, an electrophoretic fluid may have two types of pigment particles of contrasting colors and carrying opposite charges, and the two types of pigment particles are dispersed in a clear solvent or solvent mixture. In this case, when a voltage difference is imposed between the two electrode plates, the two types of pigment particles would move to the opposite ends (top or bottom) in a display cell. Thus one of the colors of the two types of the pigment particles would be seen at the viewing side of the display cell.

In another alternative, color pigment particles are added to an electrophoretic fluid for forming a highlight or multicolor display device.

For all types of the electrophoretic displays, the fluid contained within the individual display cells of the display is undoubtedly one of the most crucial parts of the device. The composition of the fluid determines, to a large extent, the lifetime, contrast ratio, switching rate and bistability of the device.

In an ideal fluid, the charged pigment particles remain separate and do not agglomerate or stick to each other or to the electrodes, under all operating conditions. In addition, all components in the fluid must be chemically stable and compatible with the other materials present in an electrophoretic display.

Currently, the pigment particles in an electrophoretic fluid often have a density which is much higher than that of the solvent in which the particles are dispersed, thus causing performance issues, such as poor grey level bistability, vertical driving and settling phenomena.

SUMMARY OF THE INVENTION

Figure 1:
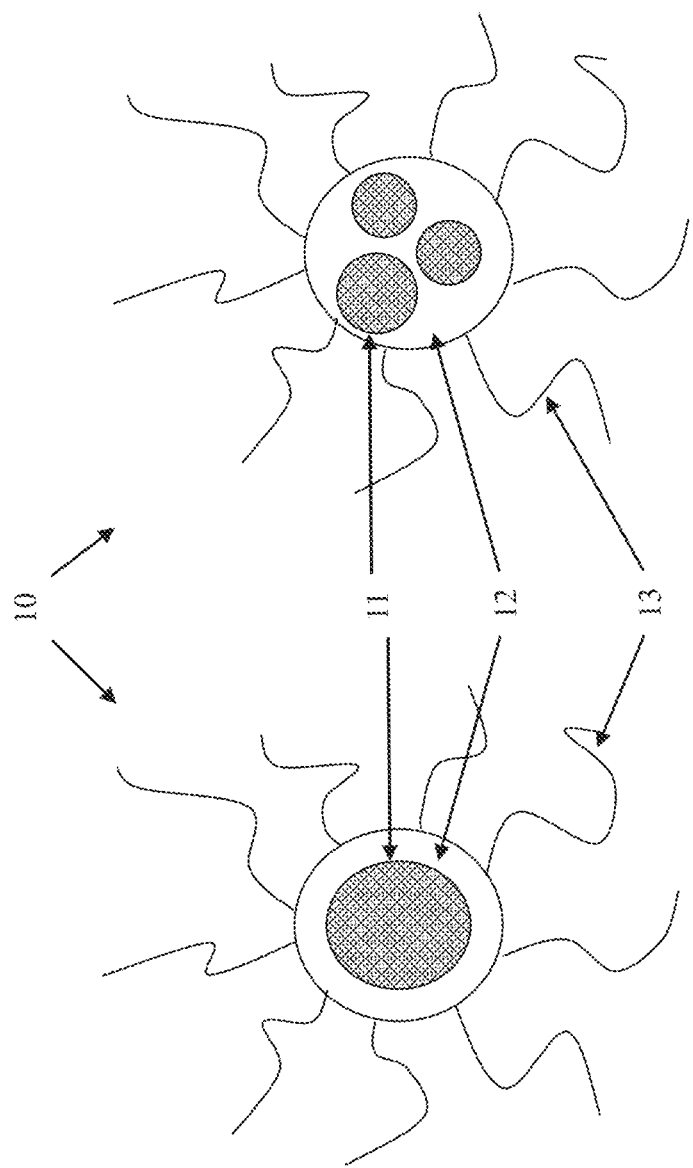
FIGS. 1a and 1b show the composite pigment particles of the present invention.

The present invention is directed to a display fluid comprising charged composite pigment particles dispersed in a solvent, wherein each of said composite pigment particles comprises at least a core pigment particle, a shell coated over the core pigment particle and steric stabilizer molecules on the surface of the composite pigment particles.

In one embodiment, the density of the composite pigment particles substantially matches to that of the solvent.

In one embodiment, the difference between the density of the composite pigment particles and the density of the solvent is less than 2 $g/cm^3$.

In one embodiment, the core pigment particle is an inorganic pigment particle and the core pigment particles may be surface treated or surface untreated. In this embodiment, the shell of the core pigment particle may be formed from an inorganic material, and if so, the organic content of the composite pigment particles may be in the range of about 10% to about 50% by weight, preferably more than about 15% up to about 30% by weight. The shell may also be formed from an organic material, and in that case, the organic content of the composite pigment particles may be at least about 20% by weight, preferably about 20% to about 70% by weight and more preferably about 20% to about 40% by weight.

In one embodiment, the core pigment particle may be an organic pigment particle. In this embodiment, the core pigment particle may also be surface treated or surface untreated. The polymer content of the composite pigment particles with an organic core particle may be at least about 20%, preferably about 30% to about 70% by weight and more preferably about 40% to about 60% by weight.

In one embodiment, the shell may be completely incompatible or relatively incompatible with the solvent.

In one embodiment, the steric stabilizer molecules may be formed from polyacrylate, polyethylene, polypropylene, polyester, polysiloxane or a mixture thereof.

In one embodiment, the surface of the shell may comprise functional groups to enable charge generation or interaction with a charge control agent.

In one embodiment, the fluid may further comprise a second type of charged pigment particles. In one embodiment, the second type of charged pigment particles is composite pigment particles comprising at least a core pigment particle, a shell coated over the core pigment particle and steric stabilizer molecules on the surface of the composite pigment particles. The two types of composite pigment particles in the fluid are of contrasting colors. In one embodiment, the fluid may comprise more than two types of pigment particles and each type has a color different from the colors of other types.

In one embodiment, the solvent in which the composite pigment particles are dispersed may be a hydrocarbon solvent or a mixture of a hydrocarbon solvent and another solvent, such as a halogenated solvent or a silicone oil type solvent.

In one embodiment, the composite pigment particles may be prepared by dispersion polymerization or living radical polymerization.

DETAILED DESCRIPTION OF THE INVENTION

The first aspect of the present invention is directed to the composite pigment particles, as shown in FIGS. 1a and 1b. The composite pigment particles are closely density matched to a solvent in which they are dispersed, especially in a hydrocarbon solvent.

The composite pigment particles (10) may have one or more core pigment particles (11). The core particle(s) (11) is/are coated with a shell (12). There are steric stabilizer molecules (13) on the surface of the composite pigment particles.

The core pigment particles may be of any colors (e.g., black, white, red, green, blue, cyan, magenta, yellow or the like).

The core particles may be formed from an inorganic material, such as $TiO_2$, $BaSO_4$, ZnO, metal oxides, manganese ferrite black spinel, copper chromite black spinel, carbon black or zinc sulfide pigment particles.

The inorganic core particles may be optionally surface treated. The surface treatment would improve compatibility of the core pigment particles to the monomer in a reaction medium or chemical bonding with the monomer, in forming the composite pigment particles. As an example, the surface treatment may be carried out with an organic silane having functional groups, such as acrylate, vinyl, —$NH_2$, —NCO, —OH or the like. These functional groups may undergo chemical reaction with the monomers.

The shell may be formed from an inorganic or organic material.

Inorganic shell materials may include silica, aluminum oxide, zinc oxide and the like or a combination thereof. Sodium silicate or tetraethoxysilane may be used as a common precursor for silica coating.

An organic shell may be formed from an organic polymer, such as polyacrylate, polyurethane, polyurea, polyethylene, polyester, polysiloxane or the like. For example, a polyacrylate shell may be formed from monomer, such as styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydoxyethyl acrylate, 2-hydroxyethyl methacrylate, dimethylaminoethyl methacrylate or the like. A polyurethane shell may be formed from monomer or oligomer, such as multifunctional isocyanate or thioisocyanate, primary alcohol or the like. A polyurea shell may be formed from monomer containing reactive groups, such as amine/isocyanate, amine/thioisocyanate or the like. A person skilled in the art would be able to select proper monomer or oligomer and its variations, based on the main idea of the present invention.

If the shell is inorganic, the structure of the shell may be porous to reduce density. The "organic content" of the resulting composite pigment particles from inorganic core particles would be in the range of about 10% to about 50% by weight, preferably more than about 15% up to about 30% by weight. In this embodiment, the term "organic content" is determined by the weight of the steric stabilizers (13) divided by the total weight of the core pigment particles (11), the shell (12) and the steric stabilizers (13).

If the shell is organic, the "organic content" of the resulting composite pigment particles from inorganic core particles would be at least about 20% by weight, preferably about 20% to about 70% by weight and more preferably about 20% to about 40% by weight. In this embodiment, the term "organic content" is determined by the total weight of the shell (12) and the steric stabilizers (13) divided by the total weight of the core pigment particles (11), the shell (12) and the steric stabilizers (13).

The density of the resulting shell, in any case, is preferably low, lower than 2 $g/cm^3$ and more preferably about 1 $g/cm^3$. The shell thickness may be controlled, based on the density of the shell material and the desired final particle density.

The shell material is either completely incompatible or relatively incompatible with the display fluid in which the composite pigment particles are dispersed. Relatively incompatible" as used herein, means that no more than about 5%, preferably no more than about 1%, of the shell material is miscible with the display fluid.

In order to achieve this complete or relative incompatibility, the shell polymer material may have polar functionality on its main chain or a side chain. Examples of such polar functionality may include —COOH, —OH, $NH_2$, R—O—R, R—NH—R and the like (wherein R is an alkyl or aryl group). Each of the side chains, in this case, preferably has less than 6 carbon atoms. In one embodiment, the main chain or the side chain may contain an aromatic moiety.

In addition, the core pigment particle(s) and the shell should behave as one single unit. This may be achieved by cross-linking or an encapsulation technique, as described below.

The steric stabilizer (13) in FIG. 1 is usually formed of high molecular weight polymers, such as polyethylene, polypropylene, polyester, polysiloxane or a mixture thereof. The steric stabilizer facilitates and stabilizes the dispersion of the composite pigment particles in a solvent.

Furthermore, the surface of the shell may optionally have functional groups that would enable charge generation or interaction with a charge control agent.

In another embodiment of the present invention, the core particles may be formed from an organic material, such as CI pigment PR 254, PR122, PR149, PG36, PG58, PG7, PY138, PY150, PY20 or the like, which are commonly used organic pigment materials described in the color index handbook "New Pigment Application Technology" (CMC Publishing Co, Ltd, 1986) and "Printing Ink Technology" (CMC Publishing Co, Ltd, 1984). Specific examples may include Clariant Hostaperm Red D3G 70-EDS, Hostaperm Pink E-EDS, PV fast red D3G, Hostaperm red D3G 70, BASF Irgazine red L 3630, Cinquasia Red L 4100 HD, Irgazin Red L 3660 HD and the like. The composite pigment particles formed from the organic core particles are usually colored, such as red, green, blue, cyan, magenta, yellow or the like.

The surface of the organic core particles may be treated or untreated. The surface treatment would improve compatibility of the core pigment particles to the monomer in a reaction medium or chemical bonding with the monomer, in forming the composite color particles. The pre-treated functional molecules can be either chemically bonded or physically absorbed onto pigment surface. The functional molecules may be a dispersant, surfactant or the like.

The shell for organic core particles is usually formed from an organic shell material as described above. The stabilizers for the composite pigment particles prepared from organic core particles may also be prepared as described below.

The "polymer content" of the composite pigment particles prepared from organic core particles may be at least about 20% by weight, preferably about 30% to about 70% by weight and more preferably about 40% to about 60% by weight. The term "polymer content" is determined by the total weight of the shell (12) and the steric stabilizers (13) divided by the total weight of the core pigment particles (11), the shell (12) and the steric stabilizers (13).

The second aspect of the present invention is directed to the preparation of the composite pigment particles of the present invention, which may involve a variety of techniques.

For example, they may be formed by dispersion polymerization. During dispersion polymerization, monomer is polymerized around core pigment particles in the presence of a steric stabilizer polymer soluble in the reaction medium. The solvent selected as the reaction medium must be a good solvent for both the monomer and the steric stabilizer polymer, but a non-solvent for the polymer shell being formed. For example, in an aliphatic hydrocarbon solvent of Isopar G®, monomer methylmethacrylate is soluble; but after polymerization, the resulting polymethylmethacrylate is not soluble.

The polymer shell formed from the monomer must be completely incompatible or relatively incompatible with the solvent in which the composite pigment particles are dispersed. Suitable monomers may be those described above, such as styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydoxyethyl acrylate, 2-hydroxyethyl methacrylate, dimethylaminoethyl methacrylate or the like.

The steric stabilizer polymer may be a reactive and polymerizable macromonomer which adsorbs, becomes incorporated or is chemically bonded onto the surface of the polymer shell being formed. The macromonomer as a steric stabilizer, determines the particle size and colloidal stability of the system.

The macromonomer may be an acrylate-terminated or vinyl-terminated macromolecule, which are suitable because the acrylate or vinyl group can co-polymerize with the monomer in the reaction medium.

The macromonomer preferably has a long tail, R, which may stabilize the composite pigment particles in a hydrocarbon solvent.

One type of macromonomers is acrylate terminated polysiloxane (Gelest, MCR-M11, MCR-M17, MCR-M22), as shown below:

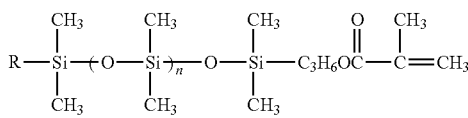

Another type of macromonomers which is suitable for the process is PE-PEO macromonomers, as shown below:

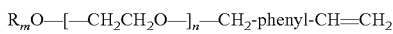

or

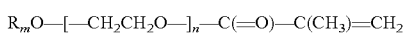

The substituent R may be a polyethylene chain, n is 1-60 and m is 1-500. The synthesis of these compounds may be found in Dongri Chao et al., Polymer Journal, Vol. 23, no. 9, 1045 (1991) and Koichi Ito et al, Macromolecules, 1991, 24, 2348.

A further type of suitable macromonomers is PE macromonomers, as shown below:

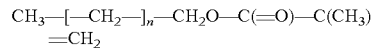

The n, in this case, is 30-100. The synthesis of this type of macromonomers may be found in Seigou Kawaguchi et al, Designed Monomers and Polymers, 2000, 3, 263.

To incorporate functional groups for charge generation, a co-monomer may be added in the reaction medium. The co-monomer may either directly charge the composite pigment particles or have interaction with a charge control agent in the display fluid to bring a desired charge polarity and charge density to the composite pigment particles. Suitable co-monomers may include vinylbenzylaminoethyl-amino-propyl-trimethoxysilane, methacryloxypropyltrimethoxysilane, acrylic acid, methacrylic acid, vinyl phosphoric acid, 2-acrylamino-2-methylpropane sulfonic acid, 2-(dimethylamino)ethyl methacrylate, N-[3-(dimethylamino)propyl]methacrylamide and the like.

Figure 2:
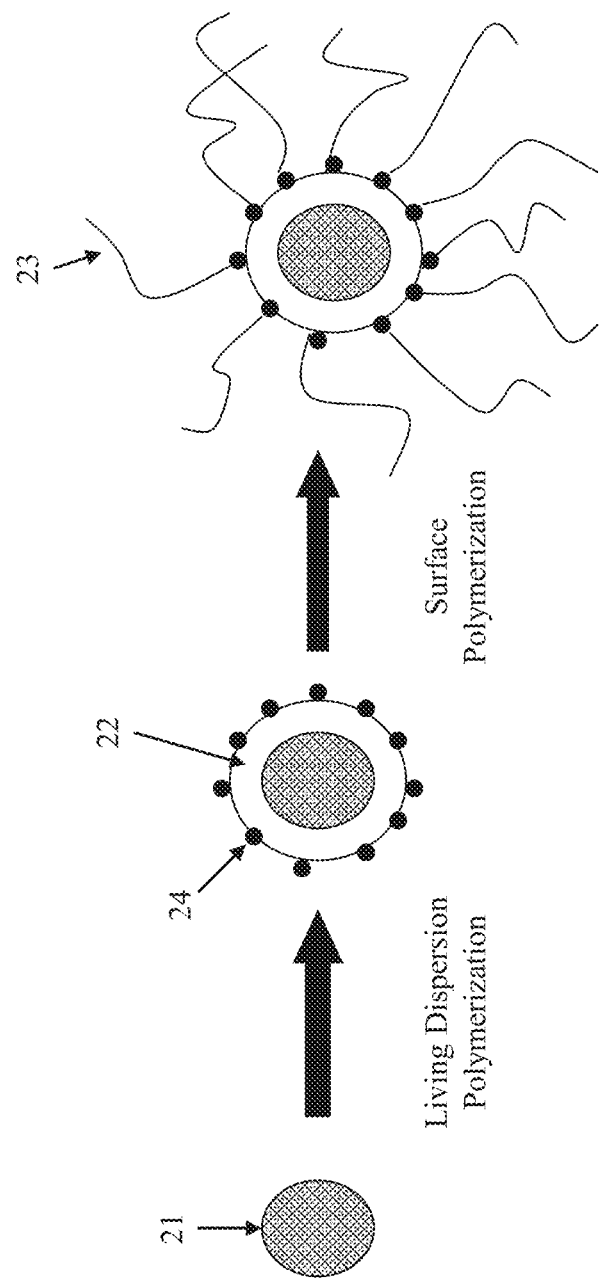
FIG. 2 shows reaction steps of a process suitable for the preparation of the composite pigment particles of the present invention.

Alternatively, the composite pigment particles may be prepared by living radical dispersion polymerization, as shown in FIG. 2.

The living radical dispersion polymerization technique is similar to the dispersion polymerization described above by starting the process with pigment particles (21) and monomer dispersed in a reaction medium.

The monomers used in the process to form the shell (22) may include styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydoxyethyl acrylate, 2-hydroxyethyl methacrylate, dimethylaminoethyl methacrylate and the like.

However in this alternative process, multiple living ends (24) are formed on the surface of the shell (22). The living ends may be created by adding an agent such as TEMPO (2,2,6,6-tetramethyl-1-piperidinyloxy), a RAFT (reversible addition-fragmentation chain transfer) reagent or the like, in the reaction medium, for the living radical polymerization.

In a further step, a second monomer is added to the reaction medium to cause the living ends (24) to react with the second monomer to form the steric stabilizers (23). The second monomer may be lauryl acrylate, lauryl methacrylate, 2-ethylhexyl acrylate, 2-ethylhexyl methacrylate, hexyl acrylate, hexyl rnethacrylate, n-octyl acrylate, n-octyl methacrylate, n-octadecyl acrylate, n-octadecyl methacrylate, or the like.

The steric stabilizers should be compatible with the solvent in which the composite pigment particles are dispersed to facilitate dispersion of the composite pigment particles in the solvent.

The steric stabilizers may also be prepared through living radical polymerization.

A co-monomer may also be added to generate charge. Suitable co-monomers may include vinylbenzylaminoethylaminopropyl-trimethoxysilane, methacryloxypropyltrimethoxysilane, acrylic acid, methacrylic acid, vinyl phosphoric acid and the like.

Further alternatively, the composite pigment particles may be formed by coating core pigment particles with polyurethane and/or polyurea.

Polyurethane and polyurea usually are not compatible to a non-polar hydrocarbon solvent and their hardness and elastic property can be tuned through the monomer composition.

In the composite pigment particles of the present invention, the shell may be a polyurethane or polyurea material. The steric stabilizers may be non-polar long chain hydrocarbon molecules.

The synthesis method is similar to emulsion or dispersion polymerization, except that polycondensation occurs, inside micelles, with polyurethane monomer and the inorganic core pigment particles.

The polyurethane or polyurea coating system may be considered as an oil-in-oil emulsion, which contains two incompatible solvents, one of which is a non-polar organic solvent and the other is a polar organic solvent. The system may also be referred to as non-aqueous emulsion polycondensation, in which the non-polar solvent is the continuous phase and the polar solvent is the non-continuous phase. The monomer and the inorganic pigment particles are in the non-continuous phase. Suitable non-polar solvents may include the solvents in the Isopar® series, cyclohexane, tetradecane, hexane or the like. The polar solvents may include acetonitrile, DMF and the like.

An emulsifier or dispersant is critical for this biphasic organic system. The molecular structure of the emulsifier or dispersant may contain one part soluble in the non-polar solvent, and another part anchoring to the polar phase. This will stabilize the micelles/droplets containing the monomer and the inorganic pigment particles and serving as a microreactor for the particle formation through polycondensation.

Suitable emulsifiers or dispersants may include di-block co-polymers, such as poly (isoprene)-b-poly(methyl methacrylate), polystyrene-b-poly(ethene-alt-propene) (Kraton) or the like.

Also, a co-emulsifier may be added to form chemical bonding with the particles. For example, amine terminated hydrocarbon molecules can react with the particles during polycondensation and bond to surface as robust steric stabilizers. Suitable co-emulsifiers may include surfonamine (B-60, B-100 or B-200) as shown below:

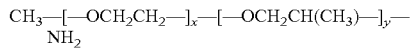

wherein x is 5-40 and y is 1-40.

An alternative approach is to continue growing polyacrylate steric stabilizers after the polycondensation reaction in the microreactor is completed. In this case, the shell is formed from polyurethane while the steric stabilizers may be polyacrylate chains. After the emulsifier or dispersant used in the process is washed away from the particle surface, the composite pigment particles are stable in the non-polar solvent (i.e., display fluid) with the polyacrylate stabilizers. Some materials that can initiate acrylate polymerization include isocyanatoethyl acrylate, isocyanatostyrene or the like.

Monomers for the steric stabilizer may be a mixture of hydroxyethyl methacrylate nd other acrylate that are compatible to the non-polar solvent, such as lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate or the like.

In any of the processes described above, the quantities of the reagents used (e.g., the inorganic core pigment particles, the shell material and the material for forming the steric stabilizers) may be adjusted and controlled to achieve the desired organic content in the resulting composite pigment particles.

The third aspect of the present invention is directed to a display fluid comprising the composite pigment particles of the present invention, which composite pigment particles are dispersed in a solvent. A preferred solvent has a low dielectric constant (preferably about 2 to 3), a high volume resistivity (preferably about 1015 ohm-cm or higher) and a low water solubility (preferably less than 10 parts per million). Suitable hydrocarbon solvents may include, but are not limited to, dodecane, tetradecane, the aliphatic hydrocarbons in the Isopar® series (Exxon, Houston, Tex.) and the like. The solvent can also be a mixture of a hydrocarbon and a halogenated carbon or silicone oil base material.

The present invention is applicable to a one-particle, two-particle or multiple particle electrophoretic display fluid system. In a multiple particle system, there may be more than two types of pigment particles and each type has a color which is different from the colors of other types.

In other words, the present invention may be directed to a display fluid comprising only the composite pigment particles prepared according to the present invention which are dispersed in a hydrocarbon solvent. The composite pigment particles and the solvent have contrasting colors.

Alternatively, the present invention may be directed to a display fluid comprising two types of pigment particles dispersed in an organic solvent and at least one of the two types of the pigment particles is prepared according to the present invention. The two types of pigment particles carry opposite charge polarities and have contrasting colors. For example, the two types of pigment particles may be black and white respectively. In this case, the black particles may be prepared according to the present invention, or the white particles may be prepared according to the present invention, or both black and white particles may be prepared according to the present invention.

The composite pigment particles prepared according to the present invention, when dispersed in an organic solvent, have many advantages. For example, the density of the composite pigment particles may be substantially matched to the organic solvent, thus improving performance of the display device. In other words, the difference between the density of the composite pigment particles and the density of the solvent is less than 2 g/cm$^3$, more preferably less than 1.5 g/cm$^3$ and most preferably less than 1 g/cm$^3$.

In the two particle system, if only one type of the pigment particles is prepared according to the present invention, the other type of pigment particles may be prepared by any other methods. For example, the particles may be polymer encapsulated pigment particles. Microencapsulation of the pigment particles may be accomplished chemically or physically. Typical microencapsulation processes include interfacial polymerization/crosslinking, in-situ polymerization/crosslinking, phase separation, simple or complex coacervation, electrostatic coating, spray drying, fluidized bed coating and solvent evaporation, etc.

The composite pigment particles prepared by the previously known techniques may also exhibit a natural charge, or may be charged explicitly using a charge control agent, or may acquire a charge when suspended in the organic solvent. Suitable charge control agents are well known in the art; they may be polymeric or non-polymeric in nature, and may also be ionic or non-ionic, including ionic surfactants such as sodium dodecylbenzenesulfonate, metal soap, polybutene succinimide, maleic anhydride copolymers, vinylpyridine copolymers, vinylpyrrolidone copolymer, (meth)acrylic acid copolymers or N,N-dimethylaminoethyl (meth)acrylate copolymers), AlcolecLV30 (soy lecithin), Petrostep B100 (petroleum sulfonate) or B70 (barium sulfonate), Solsperse 17000 (active polymeric dispersant), Solsperse 9000 (active polymeric dispersant), OLOA 11000 (succinimide ashless dispersant), OLOA 1200 (polyisobutylene succinimides), Unithox 750 (ethoxylates), Petronate L (sodium sulfonate), Disper BYK 101, 2095, 185, 116, 9077 & 220 and ANTI-TERRA series.

EXAMPLES

Example 1

Step A: Deposition of Vinylbenzylaminoethylaminopropyl-trimethoxysilane on Black Pigment Particles To a 1 L reactor, Black 444 (Shepherd, 40 g), isopropanol (320 g), DI water (12 g), ammonium hydroxide (28%, 0.4 g) and Z-6032 (Dow Corning, 16 g, 40% in methanol) were added. The reactor was heated to 65° C. with mechanical stirring in a sonication bath. After 5 hours, the mixture was centrifuged at 6000 rpm for 10 minutes. The solids were redispersed in isopropanol (300 g), centrifuged and dried at 50° C. under vacuum overnight to produce 38 g of desired pigment particles.

Step B: Preparation of Polymer Coating on Pigment Particles through Dispersion Polymerization Two (2) g of polyvinylpyrrolidone (PVP K30) was dissolved in a mixture of 94.5 g water and 5.5 g ethanol. The solution was purged with nitrogen for 20 minutes and heated to 65° C. The pigment particles (4 g) prepared from Step A was dispersed in a mixture of 3.0 g lauryl acrylate, 0.2 g divinylbezene and 0.03 g AIBN (azobisisobutyronitrile) to form a uniform suspension. This suspension was added into the PVP solution at 65° C. With stirring, the polymerization reaction lasted about 12 hours.

Then a mixture of 3.0 g octadecyl acrylate and 0.03 g AIBN was added into the above reaction flask and the reaction was continued for 12 hours.

The solids produced were separated from the liquid through centrifugation and then washed with isopropanol and methylethylketone to remove PVP K30 and other chemicals that were not bonded on the pigment particles. The solids were dried at 50° C. under vacuum to produce final composite black particles. The organic content of the particles produced was about 34% by weight, tested through TGA (thermal gravimetric analysis).

Example 2

Synthesis of Colored Composite Pigment Particles

Hostaperm Red D3G 70-EDS (3,6-Bis(4-chlorophenyl) pyrrolo[3,4-c]pyrrole-1,4(2H,5H)-dione; a diketopyrrolopyrrole; Clariant, 2.5 g), methyl methacrylate (8 g; Sigma) and toluene (2 g; Sigma) were added into a 20 ml vial and sonicated for 2 hours. In a 250 mL reactor, the above mixture, MCR-M22 (monomethacryloxypropyl terminated polydimethylsiloxane; Gelest, 5.7 g) and DMS-T01 (trimethylsiloxy terminated polydimethylsiloxane; Gelest, 30 g) were added. The reactor was heated to 70° C. with magnetic stirring and purged with nitrogen for 20 minutes, followed by the addition of lauroyl peroxide (0.07 g). After 19 hours, the mixture was centrifuged at 5000 rpm for 15 minutes. The solids produced were redispersed in hexane and centrifuged. This cycle was repeated twice and the solids were dried at room temperature under vacuum to produce the final particles. The polymer content of the particles produced was about 49% by weight, tested through TGA (thermal gravimetric analysis).

While the present invention has been described with reference to the specific embodiments thereof, it should be understood by those skilled in the art that various changes may be made and equivalents may be substituted without departing from the scope of the invention.

What is claimed is:

1. A particle comprising:
   a core comprising a diketopyrrolopyrrole pigment;
   a shell substantially surrounding the core and comprising a methacrylate polymer; and steric polymers comprising a polysiloxane coupled to or absorbed by the shell, wherein the combined weight of the methacrylate and the polysiloxane is between 30% and 70% of the total weight of the particle, and
   wherein the diketopyrrolopyrrole pigment is 3,6-Bis(4-chlorophenyl)pyrrolo[3,4-c]pyrrole-1,4(2H,5H)-dione.

2. The particle of claim 1, wherein the methacrylate poly comprises methyl methacrylate.

3. The particle of claim 1, wherein the polysiloxane comprises dimethylsiloxane.

4. The particle of claim 1, wherein the combined weight of the methacrylate and the polysiloxane is between 40% and 60% of the total weight of the particle.

5. A display fluid comprising a particle of claim 1.

* * * * *